(12) United States Patent
Neuberth et al.

(10) Patent No.: US 9,624,991 B2
(45) Date of Patent: Apr. 18, 2017

(54) METHOD FOR REDUCING CHATTER VIBRATIONS IN A DRIVETRAIN

(71) Applicant: Schaeffler Technologies GmbH & Co. KG, Herzogenaurach (DE)

(72) Inventors: Ulrich Neuberth, Oetigheim (DE); Michael Reuschel, Ottersweier (DE)

(73) Assignee: Schaeffler Technologies AG & Co. KG (DE)

( * ) Notice: Subject to any disclaimer, the term of this patent is extended or adjusted under 35 U.S.C. 154(b) by 289 days.

(21) Appl. No.: 14/391,619

(22) PCT Filed: Mar. 18, 2013

(86) PCT No.: PCT/EP2013/055536
§ 371 (c)(1),
(2) Date: Oct. 9, 2014

(87) PCT Pub. No.: WO2013/152922
PCT Pub. Date: Oct. 17, 2013

(65) Prior Publication Data
US 2015/0060230 A1   Mar. 5, 2015

(30) Foreign Application Priority Data

Apr. 11, 2012 (DE) .................. 10 2012 205 821
Jul. 24, 2012 (DE) .................. 10 2012 212 935

(51) Int. Cl.
*F16D 48/06* (2006.01)
*F16F 15/10* (2006.01)

(52) U.S. Cl.
CPC ............. *F16D 48/06* (2013.01); *F16F 15/10* (2013.01); *F16D 2500/1045* (2013.01); *F16D 2500/10412* (2013.01); *F16D 2500/30816* (2013.01); *F16D 2500/3163* (2013.01); *F16D 2500/50293* (2013.01); *F16D 2500/7044* (2013.01); *F16D 2500/70668* (2013.01); *F16D 2500/70689* (2013.01)

(58) Field of Classification Search
None
See application file for complete search history.

(56) References Cited

U.S. PATENT DOCUMENTS

| 4,687,171 | A | * | 8/1987 | Freudenberg | .......... F16F 13/26 |
| | | | | | 248/636 |
| 2010/0185373 | A1 | * | 7/2010 | Herter | .................. B60W 30/20 |
| | | | | | 701/67 |

FOREIGN PATENT DOCUMENTS

| CN | 86100250 | 9/1986 |
| CN | 86103955 | 12/1986 |
| CN | 1108188 | 9/1995 |
| CN | 1547647 | 11/2004 |
| CN | 1682042 | 10/2005 |
| DE | 10323567 | 12/2003 |
| DE | 102005009710 | 10/2005 |
| DE | 102007032206 | 1/2009 |
| DE | 102011865579.9 | 11/2011 |

(Continued)

*Primary Examiner* — Edwin A Young
(74) *Attorney, Agent, or Firm* — Simpson & Simpson, PLLC

(57) ABSTRACT

A method is provided for reducing chatter vibrations in a motor vehicle drivetrain having a drive unit, a vehicle transmission and an automated friction clutch, wherein a vibration absorber is emulated by an appropriate operation of the friction clutch in order to improve the method.

9 Claims, 4 Drawing Sheets

(56) References Cited

FOREIGN PATENT DOCUMENTS

| | | |
|---|---|---|
| DE | 102012217132 | 4/2013 |
| WO | WO03019029 | 3/2003 |
| WO | WO03100279 | 12/2003 |
| WO | WO2004027285 | 4/2004 |

* cited by examiner

METHOD FOR REDUCING CHATTER VIBRATIONS IN A DRIVETRAIN

CROSS-REFERENCE TO RELATED APPLICATIONS

The present application is the U.S. national stage application pursuant to 35 U.S.C. §371 of International Application No. PCT/EP2013/055536, filed Mar. 18, 2013, which application claims priority from German Patent Application Nos. DE 10 2012 205 821.4, filed Apr. 11, 2012, and DE 10 2012 212 935.9, filed Jul. 24, 2012, which applications are incorporated herein by reference in their entireties.

TECHNICAL FIELD

The present disclosure relates generally to a method for reducing chatter vibrations in a motor vehicle drivetrain having a drive unit, a vehicle transmission and an automated friction clutch.

BACKGROUND

A method is known from German Patent No. DE 103 23 567 A1 for modulating the torque transmitted by a vehicle clutch, in particular during the engaging of the clutch when driving off. In this method, the torque is modulated depending on a variable derived only from the speed of rotation of the clutch plate in order to specify a method for modulating the torque transmitted by the clutch at which chatter vibrations can be controlled more precisely.

A method is known from German Patent Application Publication No. 10 2011 086 579.9 for reducing chatter vibrations in a motor vehicle drivetrain having a drive unit, a vehicle transmission and an automated friction clutch. In order for the activation of the clutch actuator to take place in a phase-variable manner depending on the vibration frequency that occurs, and with a signal that is as smooth as possible without stimulating higher frequency components, the following steps are carried out: (1) multiplying a present signal value of a signal that describes a sine function over time with a starting frequency, with the present signal value of the signal of the transmission input speed to a present value Sine_product, and multiplying a present signal value of a signal that describes a cosine function over time with a starting frequency, with the present signal value of the signal of the transmission input speed to a present value Cosine_product; (2) calculating a sliding average over the present value Sine_product as well as all values Sine_product, which, starting from the present value Sine_product, have been obtained over a period of the starting frequency and assigned to a value Sine_portion, and calculating a sliding average over the present value Cosine_product as well as all values Cosine_product, which, starting from the present value Cosine_product, have been obtained over a period of the starting frequency and assigned to a value Cosine_portion; (3) ascertaining the amplitude from the values Sine_portion and Cosine_portion; (4) ascertaining the phase shift between the signal of the transmission input speed and the cosine function; (5) ascertaining a signal which represents the chatter vibration from the amplitude and the phase shift; (6) ascertaining a value of a phase shift of the signal, which represents the chatter vibration, where the value is chosen so that when there is a phase shift of the signal representing the chatter vibration, it produces a control signal to the clutch actuating system at this value, which reduces the chatter vibration.

SUMMARY

According to aspects illustrated herein, there is provided a method for reducing chatter vibrations in a motor vehicle drivetrain having a drive unit, a vehicle transmission, and an automated friction clutch, the method comprising the step of emulating a vibration absorber by an appropriate operation of the friction clutch.

A general object of the disclosure is to provide a solution which functions more robustly in order to minimize the risk of complaints in series applications.

Another object of the disclosure is to provide a method that is better verifiable when a plurality of frequency components occur with comparable amplitude in the sensitive range.

A further object of the disclosure is to simplify the activation when a phase jump takes place in the input signal, or when amplitude or frequency change greatly.

Another object of the disclosure is to improve results when there is weak, strong, geometric or parametric chatter.

Another object of the disclosure is to improve the predictability of the mode of operation.

Another object of the disclosure is to simplify a pointed design of power train damping.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

Figure 1:
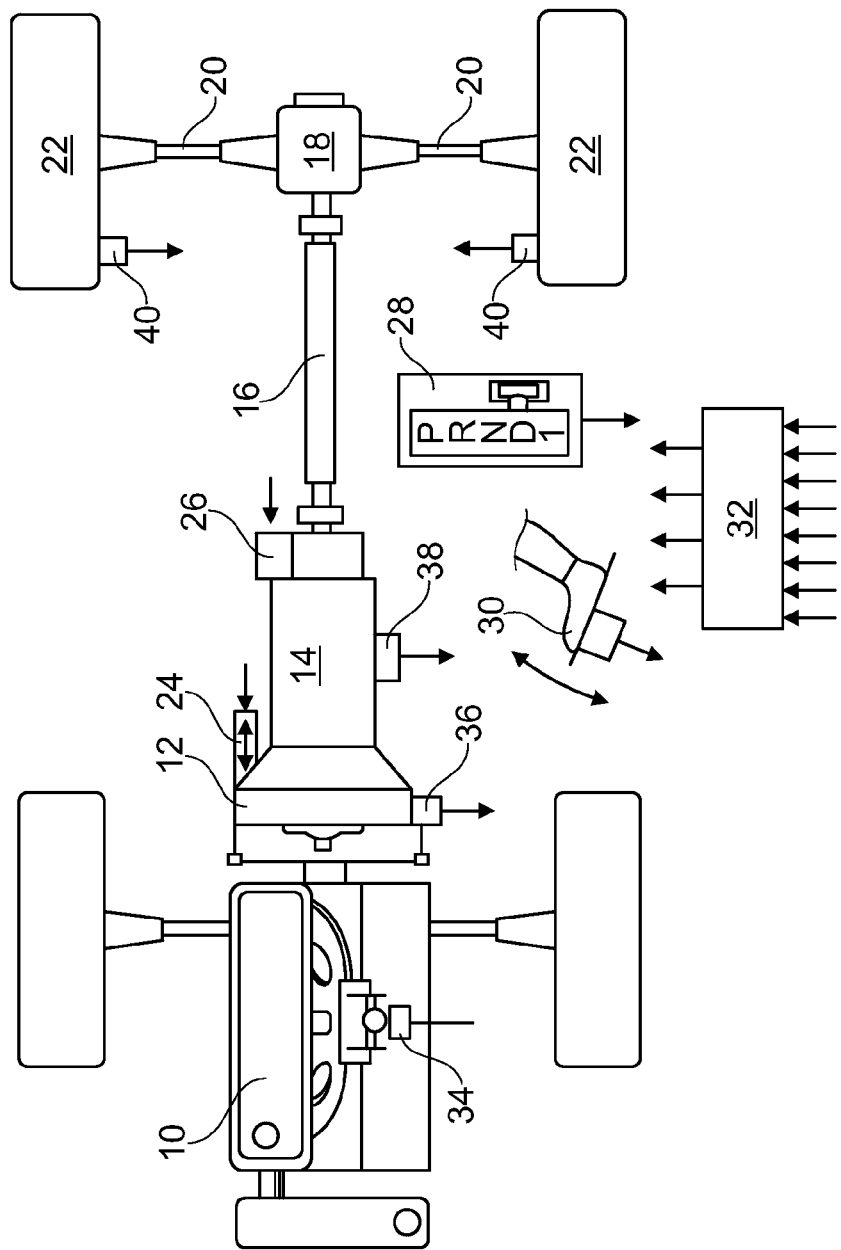
FIG. 1 is a configuration of a vehicle drivetrain having an automated clutch.

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

A friction clutch of the present disclosure may be situated in a motor vehicle drivetrain between the drive unit and the transmission. The motor vehicle drivetrain may have a torsional vibration damper, in particular a dual-mass flywheel. The torsional vibration damper may be situated in the motor vehicle drivetrain between the drive unit and the friction clutch. The drive unit may be a combustion engine. The motor vehicle drivetrain may have at least one drivable wheel.

The friction clutch may have an input part and at least one output part. In an exemplary embodiment, the friction clutch may have an input part and exactly one output part. In an exemplary embodiment, the friction clutch may have an input part and two output parts. The friction clutch may be a single clutch. The friction clutch may be a dual clutch. The dual clutch may have a first clutch and a second clutch. The friction clutch or clutch may be a single disk clutch. The friction clutch or clutch may be a multiple disk clutch. The friction clutch or clutch may be a dry clutch. The friction clutch or clutch may be a wet clutch. The friction clutch or clutch may be self-engaging. The friction clutch or clutch may be self-disengaging. The friction clutch or clutch may be a push clutch. The friction clutch or clutch may be a pull clutch.

The friction clutch, starting from a completely disengaged actuating position, in which there is essentially no transmission of power between the input part and the output part, may enable an increasing transmission of power, depending on actuation, all the way to a completely engaged actuating position, in which there is essentially complete transmission of power between the input part and the output part, where a transmission of power between the input part and the output part takes place non-positively, in particular by frictional engagement. Conversely, starting from a completely engaged actuating position, in which there is essentially complete transmission of power between the input part and the output part, a decrease in transmission of power may be enabled, depending on actuation, all the way to a completely disengaged actuating position, in which there is essentially no transmission of power.

"Automated" may denote automated operability of the friction clutch. In an exemplary embodiment, an actuating device may serve to operate the friction clutch. The actuating device may have at least one actuator. The at least one actuator may serve to act on the friction clutch mechanically. The at least one actuator may have an electric motor. The at least one actuator may have a gear unit, such as a worm gear. The gear unit may be self-arresting. The actuating device may have exactly one actuator. The actuating device may have two actuators. The actuating device may have at least one control device. The at least one control device may serve to control the at least one actuator. The at least one control device may produce output signals to control the at least one actuator. The at least one control device may be at least partially integrated structurally into the at least one actuator. Input signals may be available to the at least one control device. In an exemplary embodiment, the input signals may be sensor signals. The input signals may be signals from a rotational speed sensor, an acceleration sensor, a distance sensor, a force sensor, a torque sensor and/or other signals which are relevant to the drivetrain torque. The at least one control device may have a computing device. The computing device may have a processor. The at least one control device may have a storage device. The storage device may have a buffer memory.

"Can" or "may" designate in particular optional features of the invention. Accordingly, in each case there is one exemplary embodiment of the invention which has the particular feature or particular features.

Chatter vibrations may be torsional vibrations which are caused by a catching of the friction clutch. "Catching" can designate an unintended brief slipping of the friction clutch, which may occur repeatedly and/or periodically. Chatter vibrations may have a characteristic frequency pattern. Chatter vibrations may have a characteristic amplitude pattern. Chatter vibrations may have phase jumps.

A mechanical vibration absorber may be emulated by an appropriate action of the friction clutch. To that end, the friction clutch may be disengaged and/or engaged in such a way that moments of torque are applied in a manner that follow the chatter vibrations at a phase offset in such a way that energy is extracted from the chatter vibrations and a damping is achieved. The method may be applied temporarily during operation of the motor vehicle. The method may be applied in predetermined operating situations. The method may be applied when the necessary parameters are available in sufficient quality.

Driving comfort is further improved using the method according to the present disclosure. For example: a mechanical vibration absorber may be dispensed with; production and/or maintenance costs are reduced; reduction of chatter vibrations is improved; robustness of the method is increased; controllability of the method is improved; direct determination of the frequency of the chatter vibrations is not necessary; improvements are achieved in an expanded operating range; and, a mode of operation may be better predicted.

A vibration absorber may be emulated with the help of a transfer function whose magnitude has a maximum in the area of a resonant frequency of the motor vehicle drivetrain. A rise to and/or a drop-off from the maximum magnitude may be adjustable. A vibration absorber may be emulated with the help of a transfer function that has a phase shift. The phase shift may be chosen so that a regeneratively coupled signal acts in phase opposition, that is, with a phase shift of $-180°$, relative to the original disturbance. The transfer function may have a phase shift which corresponds to a phase shift between a clutch torque and a rotation speed signal. The transfer function may have a phase shift of $-90°$. Further, the phase shift may be adjustable, which enables a phase shift between a clutch torque and a rotation speed signal to be adjusted. The phase shift may be realized with the help of a time shift, using the storage device. In an exemplary embodiment, a filtering may be carried out when emulating a vibration absorber. A high pass filter may be used to suppress low-frequency components when emulating a vibration absorber. In an exemplary embodiment, amplification may be carried out when emulating a vibration absorber.

A vibration absorber may be emulated with the help of a transfer function that is obtained by interconnecting linear control elements. The control elements may each be capable of being parameterized separately. This enables an adaptation to be made to a particular motor vehicle drivetrain. An optimal compromise can be achieved in each case between damping at the resonant frequency and amplification outside of the resonance. A parameterizing of the control elements can be adjusted in each case. This enables a reduction of chatter vibrations adjusted depending on the operating situation. In particular, an adaptation may be made to a selected gear step, a transmission temperature and/or a clutch temperature. In an exemplary embodiment, an adjustment may be made by calibrating characteristic diagrams. The characteristic maps may contain the parameters necessary for carrying out the method. An adjustment may be made by means of adaptation algorithms. An adjustment may be made by observing the behavior of the motor vehicle drivetrain. An adjustment may be made by observing the resonant frequency. This ensures a functionality of the damping of the motor vehicle drivetrain. It is possible to monitor whether parameters are located in the expected operating space, or whether borderline situations occur.

Borderline situations can be diagnosed. When a borderline situation is identified, an entry may be made in a fault memory. This makes it possible to recognized threats of damage in the area of the motor vehicle drivetrain.

To emulate a vibration absorber, a signal of a transmission input shaft rotation speed may be fed to the transfer function as an input value, and the transfer function may supply a signal as an output value to modulate a clutch torque request.

In general, the present disclosure yields, among other things, a depiction of a software absorber to reduce chatter vibrations. It is possible to achieve a virtual coupling of a mass to the system through modulation of the clutch positioner, depending on the transmission input speed signal. To this end, the transmission input speed signal may be filtered appropriately, so that a transfer function is obtained that may have any one of the following properties or any combination of the following properties: advantageously utilizing the predictability of a linear filter function; the amplitude pattern (over frequency) may have a maximum in the vicinity of the natural frequency of the power train, and may drop off sharply toward zero above and below it; the strength of the drop-off can be adjusted for high and low frequencies, which can result in a typical full width half maximum (FWHM); the phase shift can be such that it is phase-opposed in resonance to the original torque disturbance through the regenerative coupling via the target clutch torque; vibrations at the resonant frequency can be at least partially extinguished by means of appropriate total amplification; the phase shift may change continuously above and below the resonant frequency, whereby together with the sharply declining amplitude an appreciable amplification can be avoided.

In an exemplary embodiment, the software absorber can be described by a specific transfer function. One possibility for obtaining a suitable transfer function may be to interconnect linear control elements.

An exemplary embodiment of the method of the present disclosure can be characterized by the points described as follows. A control algorithm can be used in a vehicle having automated clutch activation to suppress or significantly reduce (chatter) vibrations in the vicinity of a power train resonant frequency. The control algorithm uses a transmission input rotation speed signal as the input value and outputs a signal to modulate (offset) the target clutch torque. In an exemplary embodiment, other signals that are relevant to power train torque may be used as the input value. The control algorithm uses a series of linear filter functions in order to achieve a compromise between the greatest possible damping at the resonant frequency and the smallest possible amplification outside of the resonant frequency. The control algorithm can be tuned by means of various parameters in such a way that it takes account of a resonant frequency, a resonance width, a total amplification, a phase shift at a certain frequency and a weighting between high and low frequencies. The use of exclusively linear filter elements makes for considerable robustness or controllability; in particular, an overlaying of multiple filter levels (for example, to absorb multiple resonances) with foreseeable reciprocal effects is also conceivable. The filter elements used can be implemented easily and at low memory and computing cost in a real time control device. The variability of the various filter elements enables adaptation to fixed or temporally (in reference to the resonant frequency) slow changeable operating parameters.

Referring now to the figures, FIG. 1 shows a configuration of a vehicle drivetrain having an automated clutch. Drive motor 10 (or engine 10) is connected through clutch 12 to gear unit 14 (or shift transmission 14), which is connected in the present case through cardan shaft 16 to differential 18, which in turn is connected through jointed shafts 20 to rear wheels 22. The drivetrain may also be a drivetrain for a vehicle having front-wheel drive or four-wheel drive.

Clutch 12 is actuated by an actuating device or actuator 24. Shift transmission 14 in the present case is an automated shift transmission which is actuated by actuating device 26.

To operate the transmission, selector unit 28 is provided whereby the various driving programs or gears may be selected. For load control of engine 10, accelerator pedal 30 is used. Accelerator pedal 30 is connected directly or through electronic control unit 32 to power setting unit 34 of drive motor 10.

Connected to electric control unit 32 are sensors, such as: sensor 36 for detecting the speed of rotation of a flywheel of motor 10; sensor 38 for detecting the speed of rotation of a clutch plate, not shown, or of the input shaft of gear unit 14; rotational speed sensors 40 for detecting the rotational speeds of the wheels; and, other sensors, for example a coolant temperature sensor, a sensor for detecting the position of the power setting unit, a sensor for detecting the position of the clutch, etc. In electronic control unit 32, which contains a microprocessor with associated storage devices, programs are stored with which actuating device 26, actuator 24 and an actuator for power setting unit 34 are controlled.

Clutch 12 is controlled in such a way that a torque which is dependent on operating conditions of the drivetrain is transmissible in each case. The torque transmissible by the clutch depends on the power or the travel distance with which actuator 24 actuates the clutch. In particular, when engaging the clutch, as a consequence of the transition between sliding friction and cohesive friction and the interaction with the vibration-capable drivetrain, torsional vibrations occur, which are also referred to as chatter, and not only have a negative influence on comfort, but also an unfavorable influence on the fatigue strength.

Figure 2:
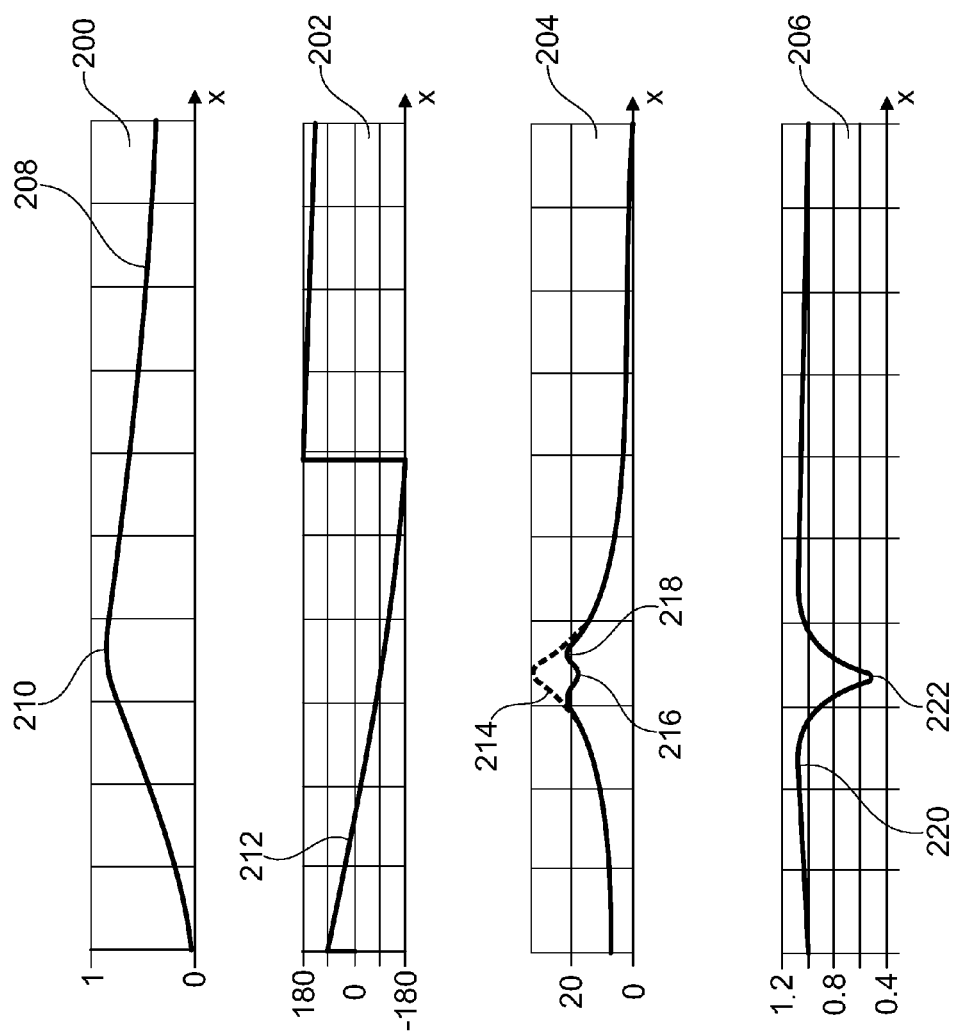
FIG. 2 is a set of diagrams and characteristic curves of a transfer function used to emulate a vibration absorber to reduce chatter vibrations in a vehicle drivetrain.

FIG. 2 shows diagrams 200, 202, 204, 206, with characteristic curves of a transfer function to emulate a vibration absorber to reduce chatter vibrations in a vehicle drivetrain. Here, a clutch, such as clutch 12 according to FIG. 1, is controlled in such a way that chatter vibrations in the vehicle drivetrain are reduced. A frequency is plotted in each case on the x axis. In diagram 200, characteristic curve 208 depicts the magnitude of a transfer function. Characteristic curve 208, starting from a frequency of 0 Hz, rises initially in an S-like pattern to maximum value 210. Maximum value 210 lies in the range of a resonant frequency of the vehicle drivetrain. In an exemplary embodiment, maximum value 210 occurs at a frequency of approximately 4-10 Hz. In an exemplary embodiment, maximum value 210 occurs at a frequency of approximately 6-8 Hz. Toward higher frequency values, characteristic curve 208 drops off. At a frequency of 20 Hz, characteristic curve 208 has dropped to approximately half maximum value 210. In diagram 202, characteristic curve 212 depicts a phase shift of a transfer function. The phase shift is located at −90°, so that a regeneratively coupled signal is in phase opposition, i.e., −180°, to the original disturbance. In diagram 204, characteristic curve 214 depicts an unregulated amplitude pattern, and characteristic curve 216 depicts a regulated amplitude pattern. The unregulated amplitude pattern has a maximum value. The regulated amplitude pattern has a clearly reduced maximum amplitude 218. In diagram 206, characteristic curve 220 depicts the result of a regenerative coupling as the relationship between the unregulated amplitude pattern and the regulated amplitude pattern (gain). Characteristic curve 220, starting from a frequency of 0 and a value of approximately 1, initially rises slightly, and then drops to minimum value 222. In an exemplary embodiment, minimum value 222 is approximately 0.4-0.6. In an exemplary embodiment, minimum value 222 is approximately 0.5. In an exemplary embodiment, minimum value 222 lies in the range of a resonant frequency of the vehicle drivetrain. Toward higher frequency values, characteristic curve 220 rises again, and at a frequency of 20 Hz, again, approaches the starting value of approximately 1.

Figure 3:
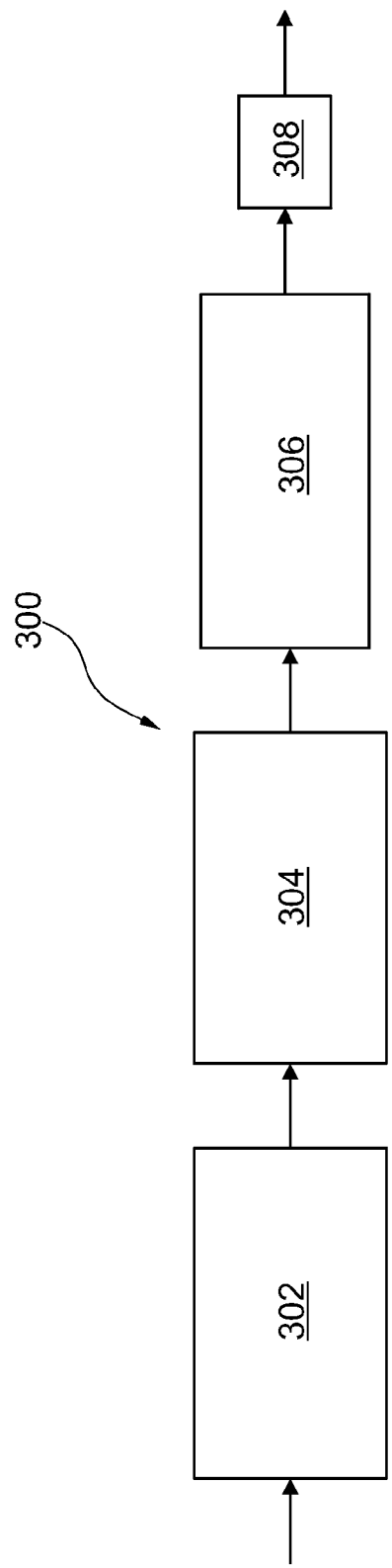
FIG. 3 is a diagram of an interconnection of control elements in order to obtain a transfer function; and, FIG. 4 is a diagram of a control link on which the transfer function acts.

FIG. 3 shows diagram 300 for an interconnection of control elements 302, 304, 306, 308 in order to obtain a transfer function like the transfer function according to FIG. 2. Control elements 302, 304, 306, 308 are all linear control elements. Control elements 302, 304, 306, 308 are arranged in series.

Control element 302 is a high pass filter with PT2 character having a corner frequency, $\omega_{HP}$, in order to filter out direct components in a rotation speed signal. The high pass filter of control element 302 is formed with the help of Function 1.

$$1 - \frac{1}{1 + 2d\frac{s}{\omega_{HP}} + \frac{s^2}{\omega_{HP}^2}} \qquad \text{Function 1}$$

Control element 304 is a PT2 filter with resonant rise (d<1) at the resonant frequency, $\omega_R$. High-frequency components are selectively reduced thereby. The PT2 filter with resonant rise of control element 304 is formed with the help of a Function 2.

$$\frac{1}{1 + 2d\frac{s}{\omega_R} + \frac{s^2}{\omega_R^2}} \qquad \text{Function 2}$$

Control element 306 is a PD element, in order to obtain a certain phase shift $\phi$ at a defined frequency $\omega_\phi$. The PD element of control element 306 is formed with the help of Function 3.

$$\cos(\varphi) + \sin(\varphi)\frac{s}{\omega_\varphi} \qquad \text{Function 3}$$

Control element 308 is a P element with a total amplification K. The individual parameters of the control elements 302, 304, 306, 308 are adjusted to the vehicle drivetrain. For example, the parameters are chosen as follows:

$\omega_{HP}=2\cdot\omega_0, \omega_R=\omega_0, d=0.5, \phi=-60°, \omega_\phi=\omega_0, mit \omega_0=6.8$ Hz.

Figure 4:
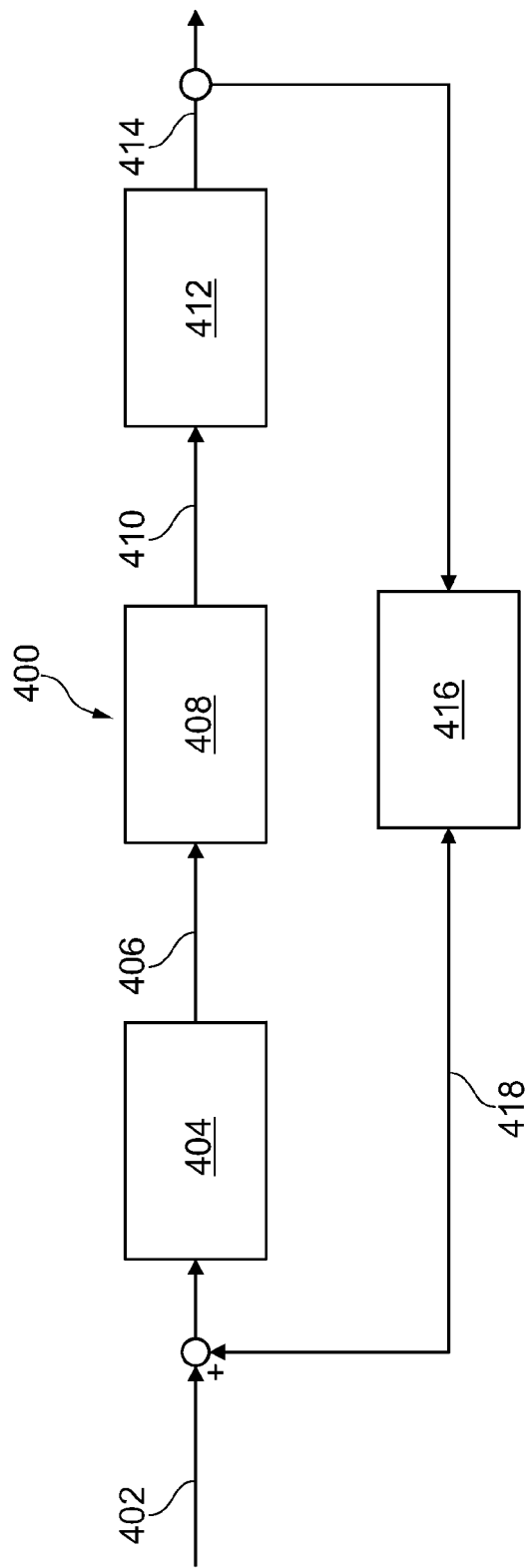

FIG. 4 shows diagram 400 for a control link on which a transfer function such as the transfer function according to FIG. 2 and FIG. 3 acts. The starting point is normal clutch torque request 402 is fed to clutch control 404, which delivers control voltage 406 as an output signal. Control voltage 406 brings about dynamic behavior 408 of the clutch and of an associated actuator. This results in actual clutch torque 410. Actual clutch torque 410 brings about dynamic behavior 412 of the vehicle drivetrain. This results in rotational speeds 414 of a transmission input shaft. The input values for emulation of a vibration absorber with the help of the transfer function are speeds of rotation 414 of the transmission input shaft. After running through control elements 416, signal 418 is delivered to modulate clutch torque request 402.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMBERS

10 Drive motor
12 Clutch
14 Shift transmission
16 Cardan shaft
18 Differential
20 Jointed shafts
22 Rear wheels
24 Actuator
26 Actuating device
28 Selector unit
30 Accelerator pedal
32 Control unit
34 Power setting unit
36 Sensor
38 Sensor
40 Rotational speed sensors
200 Diagram
202 Diagram
204 Diagram
206 Diagram
208 Characteristic curve
210 Maximum value
212 Characteristic curve
214 Characteristic curve
216 Characteristic curve
218 Reduced maximum amplitude
220 Characteristic curve
222 Minimum value
300 Diagram
302 Control element
304 Control element
306 Control element
308 Control element
400 Diagram
402 Clutch torque request
404 Clutch control
406 Control voltage
408 Dynamic behavior
410 Clutch torque
412 Dynamic behavior
414 Speeds of rotation
416 Control elements
418 Signal

What is claimed is:

1. A method for emulating a vibration absorber by reducing chatter vibrations in a motor vehicle drivetrain having a drive unit, a vehicle transmission, and an automated friction clutch, the method comprising the steps of:

receiving an input signal from at least one sensor;
determining, using a plurality of interconnected linear control elements, a transfer function;
determining, using the input signal and the transfer function, an output signal to modulate a target clutch torque; and,
sending the output signal to the automated friction clutch to modulate clutch torque.

2. The method of claim 1, wherein the transfer function comprises a maximum value in the vicinity of a resonant frequency of the motor vehicle drivetrain.

3. The method of claim 2, wherein the transfer function has a phase shift.

4. The method of claim 3, wherein the phase shift is adaptable.

5. The method of claim 2, further comprising the step of adjusting a rise or drop from the maximum.

6. The method of claim 1, further comprising the step of filtering, using a high pass filter, the input signal to suppress low-frequency components while emulating the vibration absorber.

7. The method of claim 1, further comprising the step of amplifying the input signal wherein amplification is carried out when emulating the vibration absorber.

8. The method of claim 1, wherein the linear control elements are each parameterizable separately.

9. The method of claim 1, wherein a signal of a transmission input shaft rotation speed is fed to the transfer function for emulating the vibration absorber as an input value, and the transfer function delivers a signal for modulating a clutch torque request as an output value.

* * * * *